Patented Feb. 3, 1931

1,791,238

UNITED STATES PATENT OFFICE

OTTO FUCHS, OF KONSTANZ, GERMANY, ASSIGNOR, BY MESNE ASSIGNMENTS, TO THE FIRM OF DEUTSCHE GOLD-UND SILBER-SCHEIDEANSTALT VORMALS ROESSLER, OF FRANKFORT-ON-THE-MAIN, GERMANY, A CORPORATION OF GERMANY

PROCESS FOR THE PRODUCTION OF ESTERS

No Drawing. Application filed July 23, 1928, Serial No. 294,942, and in Germany August 8, 1927.

In an earlier patent (application 228,684) is described a process for the production of esters of the lower members of the fatty acid series which is characterized in that a mixture of fatty acids and alcohols, if desired as dilute solutions, without the co-operation of catalysts, is heated to temperatures above 100° C., for example to about 150–200° C., preferably with the use of pressure, and the ester formed is continuously removed from the reaction mixture.

Further experiments have shown that in given cases the operation can be carried out commercially by effecting the process of esterification at moderately increased temperatures, for example those corresponding with saturation pressures of for example 2–10 atmospheres, from about 110 to about 180° C., in the simultaneous presence of small quantities of substances which give off hydrogen-ions and acting as catalysts so that a sufficient hydrogen-ion concentration is always present in the reaction mixture. As catalysts may be used for example mineral acids. The quantity thereof may be kept substantially below the quantities which are otherwise usual particularly for the esterification of strongly water-containing initial substances. For example acid quantities of only about 0.1% of the esterification mixture are sufficient. There may be used with particular advantage also salts of mineral acids which are subjected to an increased hydrolysis by the increased temperature in the water-containing reaction mixture and thus produce a sufficient hydrogen-ion concentration without giving rise to a too strong attack on the reaction vessels and other parts of the apparatus.

It is thus possible to use as apparatus for carrying the process into effect apparatus which were not sufficiently resistant to the strong mineral acid-containing reaction mixtures hitherto used, as for example bronzes free from zinc and various iron alloys. Amongst others there may be used as catalysts sulphates of the heavy metals, of aluminium, magnesium, ammonium and so forth, also acid phosphates of the alkalies and alkaline earths, borates and so forth. It is also possible to use salts of complex acids, organic sulpho acids and so forth and also for example such salts which by reason of the so-called buffer action produce a constant hydrogen-ion concentration.

The addition of the catalysts is preferably so adjusted that the esterification of the last traces of the acid takes place sufficiently rapidly even when using comparatively low reaction temperatures.

The removal of the ester formed from the reaction mixture is preferably effected by continuously distilling the ester therefrom.

As during the first stages of the esterification the reaction takes place sufficiently rapidly even in the absence of catalysts, it is of advantage under circumstances not to add the catalysts until later, for example after considerable quantities of the fatty acid, for example 50–60% thereof has been distilled off as ester. As mixtures of organic and mineral acids frequently have an increased capacity for attack on the material of the vessel, this capacity of attack on the apparatus is still further reduced by this method of operation.

By means of the process described it is possible to operate both discontinuously and continuously, for example in column apparatus. When operating in columns the operation for example may be such that the suitable preliminarily heated acid is forced into the column at about 2/3 the height thereof, the alcohol necessary for esterification is distributed at a number of points of the column and for example the catalyst is introduced at a lower disposed point of the column. In this manner there is also obtained the security that even in the case of irregular operation of the column the catalyst will in no case pass out at the top above the point of admission of the acid to be esterified where it would have a deleterious effect on the ester already formed by re-saponification.

*Example*

Esterification of a 10% acetic acid in methanol.

The operation is carried out either in a single high esterification column or with a battery for example three columns arranged one after the other and the acetic acid is allowed to flow continuously into the upper part of the middle column. By the external application of heat the temperature of the column is maintained at such a degree that in the interior thereof there exists a pressure of 8–9 atmospheres. At a number of points of the same column there are supplied the necessary quantities of alcohol—including the excess, which is necessary with regard to the composition of the distillate at the top.

In this column are esterified 60–70% of the acid introduced. Into the upper column passes a mixture of methyl acetate, methanol and some water which are there separated by fractional distillation. Into the lower column there flows from the middle column a 3–4% acetic acid with a portion of the alcohol. By reason of the reduction of the content of acetic acid and the reduction of the hydrogen-ion concentration caused thereby it is preferable to here increase the speed of reaction by the addition of catalysts in suitable form and quantity. For example there is supplied to the lower column for each 100 litres of the original dilute acetic acid supplied 1 litre of a 10% sulphuric acid or 1 litre of a 25% sodium bisulphate solution. In addition there is also added such a quantity of alcohol as is necessary for the esterification of the remainder of the acid. In this manner almost the last traces of the acetic acid are esterified in the last column. There is then obtained a waste water containing 0.5% acetic acid of which the neutralization and disposal does not cause any difficulties by reason of the low content of acid.

The hydrogen-ion concentration may in general be kept within a pH range of for example 3–1½, corresponding to a hydrogen-ion concentration of $10^{-3}$ to $10^{-1.5}$ equivalents per litre. The most advantageous commercial hydrogen-ion concentrations can be readily determined from case to case.

The process is particularly suitable for the esterification of initial substances containing large quantities of water for example strongly diluted acetic acid, particularly raw pyroligneous acid, further the acetic acid occurring as waste in the production of acetyl cellulose, the dilute after-running in the production of formic acid from formiates and the like.

I claim:

1. A process for the liquid phase production of esters of the lower members of the fatty acid series, consisting in causing mixtures of fatty acids and alcohols to react upon one another at temperatures of about 100–180° C., corresponding to working pressures of 2–10 atmospheres in the presence of catalysts which are capable of producing moderate hydrogen-ion concentrations and removing the ester formed continuously from the reaction mixture.

2. A process for the liquid phase production of methyl acetate consisting in causing mixtures of acetic acid and methyl alcohol to react upon one another at temperatures of about 100–180° C., corresponding to working pressures of 2–10 atmospheres, in the presence of catalysts which are capable of producing moderate hydrogen-ion concentrations, and continuously removing the ester formed from the reaction mixture.

3. A process for the production of methyl acetate according to claim 2, wherein raw pyroligneous acid is used as the initial material.

4. Process for the production of esters, according to claim 1, wherein the treatment of fatty acids with alcohols is effected in a column.

5. A process for the production of esters, according to claim 1, wherein the treatment of fatty acids with alcohols is effected in a column and the catalyst is introduced into the lower part of the column.

6. A process for the production of esters, according to claim 1, wherein the catalyst is not added until after a portion of the fatty acid used has been converted into ester.

7. A process for the production of methyl acetate from raw pyroligneous acid according to claim 1 wherein the treatment of the raw pyroligneous acid with methyl alcohol is effected in a column.

8. A process for the production of esters of the lower members of the fatty acid series which consists in causing mixtures of fatty acids and alcohols to react upon each other at temperatures from 100° C. to 180° C. and under a pressure sufficient to cause the reaction to take place in the liquid phase; in the presence of catalysts which are capable of producing hydrogen-ion concentration sufficient for esterification at said temperatures, and removing continuously the ester so formed from the reaction mixture.

9. A method according to claim 1 in which the hydrogen ion concentration is between $10^{-3}$ and $10^{-1.5}$.

10. A method according to claim 8 in which the hydrogen ion concentration is between $10^{-3}$ and $10^{-1.5}$.

OTTO FUCHS.